Dec. 23, 1924. 1,520,560
J. N. BURNO
DISPENSING APPARATUS
Filed March 30, 1920 3 Sheets-Sheet 1

Inventor
Joseph N. Burns
By Arthur L. Kent
his Atty.

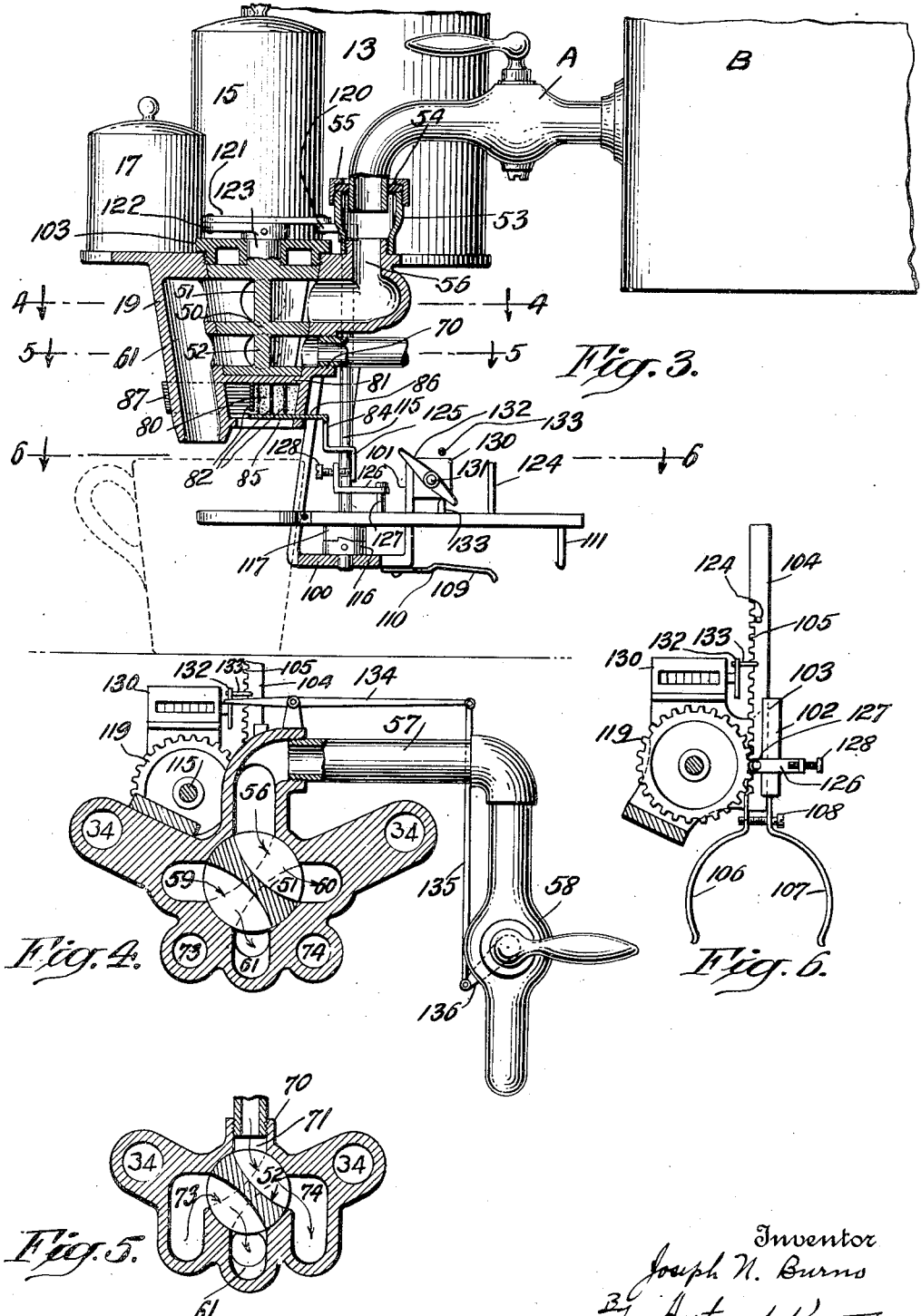

Dec. 23, 1924. 1,520,560
J. N. BURNO
DISPENSING APPARATUS
Filed March 30, 1920 3 Sheets-Sheet 3
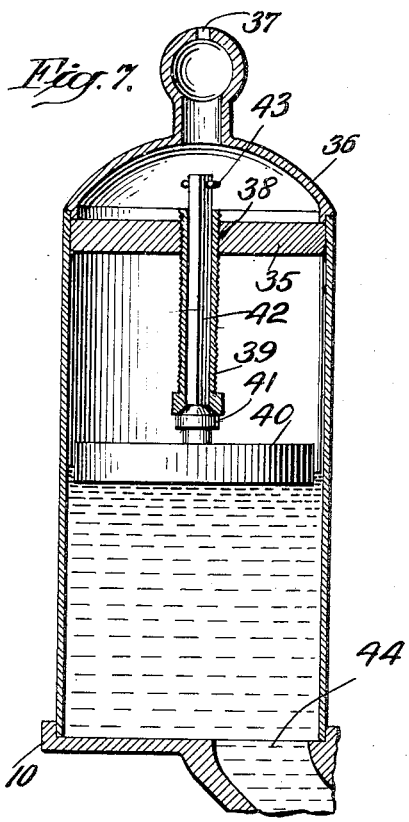
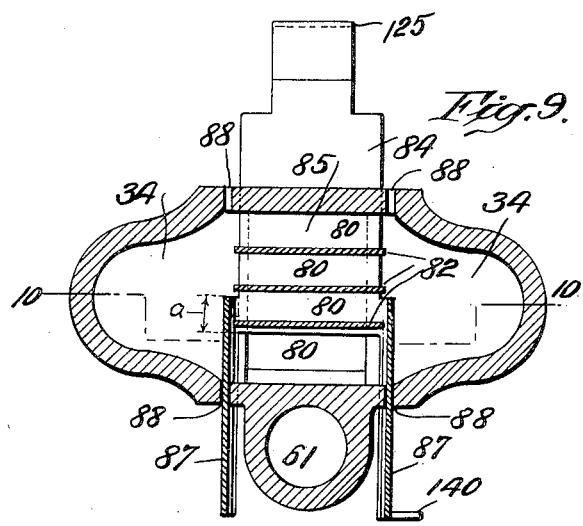
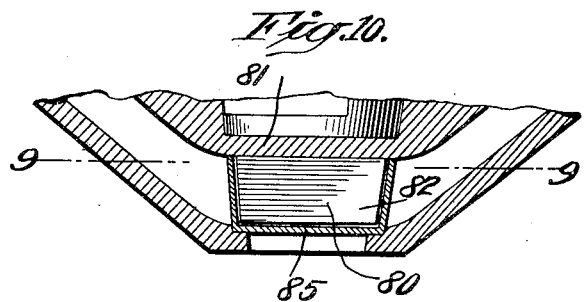
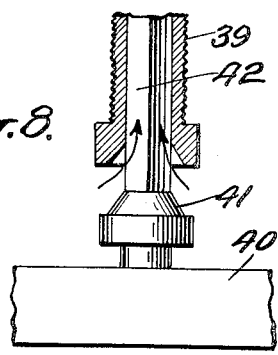
Inventor
Joseph N. Burno
By Arthur L. Kent
his Atty.

Patented Dec. 23, 1924.

1,520,560

UNITED STATES PATENT OFFICE.

JOSEPH N. BURNO, OF CHICAGO, ILLINOIS.

DISPENSING APPARATUS.

Application filed March 30, 1920. Serial No. 369,942.

*To all whom it may concern:*

Be it known that I, JOSEPH N. BURNO, a citizen of the United States, residing at Chicago, in the county of Cook and State of Illinois, have invented certain new and useful Improvements in Dispensing Apparatus, fully described and represented in the following specification and the accompanying drawings, forming a part of the same.

This invention relates to dispensing apparatus, and has for an object to provide means for dispensing liquids in predetermined quantities.

A further object of the invention is to provide for the dispensing of a mixture of a plurality of liquids in predetermined quantities containing a predetermined amount of each of said liquids.

A further object of my invention is to make a record of the amount of liquid dispensed.

A further object of my invention is to provide a dispensing means which may be automatically operated by the placing of a receptacle in position to receive the liquid dispensed.

A further object of my invention is to provide means for dispensing a liquid in predetermined quantities and for adding to each portion of the liquid dispensed a predetermined quantity of solid matter.

The invention is of particular value in the dispensing of beverages. It may be used as an attachment applied to coffee urns and milk receptacles now in use, and when so applied will automatically dispense into a receptacle placed in proper position under the attachment a predetermined quantity of coffee and a predetermined quantity of milk, and will add to the mixture in the receptacle a predetermined quantity of sugar.

Other objects and advantages of my invention are hereinafter pointed out in connection with the detailed description of the specific embodiment of my invention shown in the accompanying drawings, in which:—

Fig. 3 is a side view of the dispensing device sectioned on the line 3—3 of Fig. 2, showing a fragmentary view of a coffee urn to which the dispensing device is attached, and showing in dotted lines a coffee cup under the outlet of the dispensing device;

Fig. 4 is a horizontal section of the body of the dispensing device taken on the line 4—4 of Fig. 3, and showing the coffee valve;

Fig. 5 is a horizontal section of the body taken on the line 5—5 of Fig. 3, and showing the milk valve;

Fig. 6 is a horizontal section on the line 6—6 of Fig. 3, showing the operating mechanism;

Fig. 7 is a central vertical section of one of the intermediate containers;

Fig. 8 is a fragmentary sectional view of one of the intermediate containers with the float in a different position from that shown in Fig. 7;

Fig. 9 is a horizontal section on the line 9—9 of Fig. 10 showing the sugar chamber and valve; and Fig. 10 is a vertical section of the sugar chamber and valve taken on the line 10—10 of Fig. 9.

Figure 1:
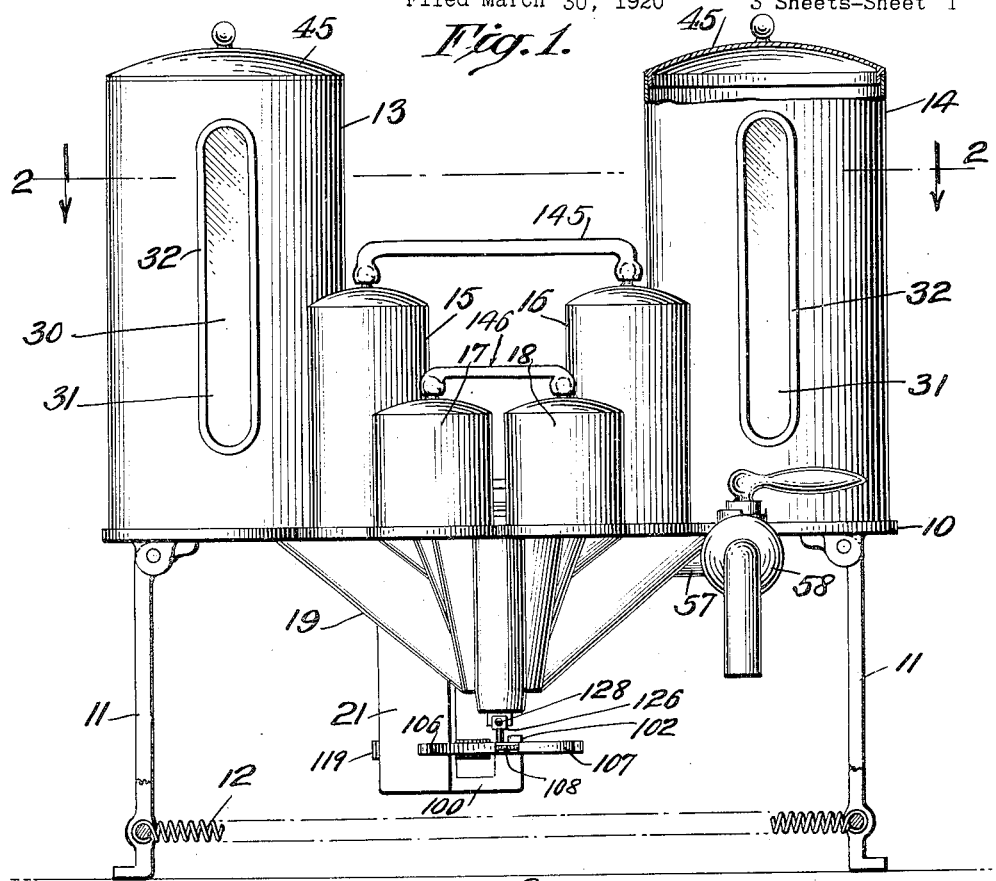
Fig. 1 is a front elevation of the dispensing device showing portions of the legs of the framework broken away, and showing tubes connecting the intermediate containers, which tubes are omitted from the construction as shown in the other figures.

The frame of the dispensing device consists of a table 10 supported by legs 11 which, in the form shown, are adapted to be spread outwardly and are held in operative position by a tension spring 12. Upon the table 10 are two sugar receptacles 13, 14, two intermediate coffee containers 15, 16, and two intermediate milk containers 17, 18. The table 10 forms the bottom of each of these receptacles. The main body of the dispensing device 19, which contains passages for the coffee, milk and sugar, and the valve for controlling the passages, is below the table 10 and may be made integral with the table 10 as shown in the drawing. The operating mechanism 20 is supported by the arm 21 depending from the body 19.

*The sugar receptacles.*—Each of the sugar receptacles 13 and 14 is provided with a vertical slot 30 which is covered with transparent material 31 retained in a frame 32. Means are thus provided for observing the level of the sugar in the container. Each sugar container is provided with a detachable cover 45. An aperture 33 in the portion of the table 10 forming the bottom of each sugar receptacle connects the sugar receptacle with the sugar passage 34 in the body.

*The intermediate containers.*—The intermediate coffee containers 15, 16 and the intermediate milk containers 17, 18, are similar except that the coffee containers are larger than the milk containers. The construction of the intermediate containers is shown in Figs. 7 and 8. Each intermediate container is provided with a substantially air-tight top 35 which is pressed into position. Above the top 35 is a removable cover 36 provided with an air vent 37. The top 35 is provided with a central hole 38 which is threaded. Screwed into the hole 38 is a threaded tube 39 which extends downwardly into the container and is provided with a concave conical portion at its bottom. Within the container is a float 40 carrying a closure 41 having a conical surface adapted to fit the conical surface at the lower end of the tube 39. A stem 42, which may be square, as shown, is attached to the float and lies within the tube 39. The stem 42 retains the float in central position within the container and assures proper contact between the closure 41 and the lower end of the tube 39 when the float is raised to the position shown in Fig. 7. A pin 43 passes through the upper portion of the stem 42. The portion of the table 10 forming the bottom of each intermediate container contains the aperture 44 connecting the container with a passage in the body 19.

Each of the intermediate containers described is adapted to hold a predetermined quantity of liquid introduced through the aperture 44. When the intermediate container is empty the float 40 hangs on the pin 43 which comes in contact with the upper end of the tube 38. As liquid is introduced through the aperture 44 the air in the container above the liquid is forced out through the tube 39 as indicated by the arrows in Fig. 8. When the liquid reaches the level at which the float is hanging the float is raised by the liquid. The liquid continues to enter the container until the closure 41 upon the float is brought into contact with the lower end of the tube 39. This closes the air outlet and the air trapped in the upper portion of the container prevents the liquid from rising higher no matter how long the passage connecting the receptacle with the source of the liquid is kept open. If the level of the liquid in the coffee urn or other source from which it is flowing is considerably higher than the intermediate container, the liquid in the container may rise slightly above the point mentioned owing to the compression of the air trapped in the top of the container; but in the apparatus shown, the additional amount of liquid admitted because of such compression of the air is negligible. When the liquid is withdrawn from the intermediate container, the float 40 and the closure 41 descend until held by the pin 43, thus permitting air to enter through the tube 39 to fill the space above the surface of the liquid.

The amount of liquid which any one of the intermediate containers may hold may be regulated by varying the position of the lower end of the tube 39. This may be done by moving the top 37 of the container and then screwing the tube 39 in or out in the hole 41 until it occupies the desired position. Before the dispensing apparatus is used the tubes 39 of each of the intermediate coffee containers 15 and 16 are adjusted to the same level. The tubes 39 of the intermediate milk containers 17 and 18 are adjusted to the same level.

*The body and valve.*—The construction of these parts is best shown in Figs. 3, 4 and 5. The body 19 contains a tapering opening in which is seated a double valve 50, the upper portion of which forms a coffee valve 51 and the lower portion of which forms a milk valve 52 separated from the coffee valve by a horizontal partition. At the rear of the body is the coffee intake 53 which is provided with a washer 54 retained by a collar 55. The intake is connected with a spigot A of an ordinary coffee receptacle B by simply inserting the end of the spigot in the central aperture of the washer 54. A passage 56 leads from the coffee intake 53 to the rear of the coffee valve 51. From one side of the passage 56 a pipe 57 leads to an ordinary spigot 58 (Fig. 4). A passage 59 leads from one side of the coffee valve to the intermediate coffee receptacle 15. A passage 60 leads from the other side of the coffee valve to the intermediate coffee receptacle 16. The outlet passage 61 opens into the front of the coffee valve.

The milk intake 70 is connected by a pipe or other convenient means to an ordinary milk receptacle placed above the intake. A short passage 71 connects the milk intake with the rear of the milk valve 52. A passage 73 leads from one side of the milk valve to the intermediate milk receptacle 17, and a passage 74 leads from the other side of the milk valve 52 to the intermediate milk receptacle 18. The outlet passage 61 connects with the front of the milk valve 52.

The double valve is so formed that when in the position shown in full lines in Figs. 4 and 5 it connects the passages 56 and 60 and the passages 59 and 61 so that coffee may flow from the coffee intake to fill the intermediate coffee receptacle 16 while the coffee in the intermediate receptacle 15 flows out through the outlet 61. At the same time, the valve connects the passages 71 and 74 and the passages 73 and 61 so that milk can flow from the milk intake to fill the intermediate milk receptacle 18, while milk contained in the intermediate receptacle 17 may flow out through the outlet 61. When the valve is turned through an angle of 90° to the position shown by dotted lines in Figs. 4 and 5, it connects the passages 56 and 59 and the passages 60 and 61 so that the intermediate receptacle 15 is filled with coffee, while the coffee contained in the intermediate receptacle 16 is discharged through the outlet 61. At the same time, the valve connects the passages 71 and 73 and the passages 74 and 61 so that the intermediate receptacle 17 is filled with milk, while the milk contained in the intermediate receptacle 18 is discharged through the outlet 61.

The lower portion of the body 19 forms the sugar chamber 80 (Figs. 3, 9, 10). This chamber is separated from the chamber in which the double valve 50 is seated by a horizontal partition 81. Vertical partitions 82 extend downwardly into the valve chamber 80 from the partition 81, dividing the chamber 80 into a plurality of compartments. The sugar passages 34 connect the sugar containers 13, 14, with the sides of the sugar chamber 80. The sugar valve 84 comprises a horizontal portion 85 passing through a slot 86 in the body and forming a bottom closure for the sugar chamber 80, and vertical or side portions 87 extending forwardly from the end of the horizontal portion 85 and passing through slots 88 in the front of the body 19.

When the sugar valve 84 is in advanced or closed position its horizontal portion 85 completely closes the bottom opening of the chamber 80, while the sides of the chamber 80 are left open to the passages 34 so that the chamber is filled with sugar from the receptacles 13 and 14. As the sugar valve 84 is pushed back the bottom openings of the compartments of the chamber 80 are successively uncovered, allowing the sugar in the compartments to fall into a receptacle placed below the chamber 80. At the same time the side portions 87 of the sugar valve successively close the sides of the compartments of the chamber 80, so that sugar from the passages 34 cannot flow into them. The distance $a$ (Fig. 9) between the front of the bottom portion 85 of the sugar valve and the back of the side portions 87 of the sugar valve is substantially equal to the width of the bottom opening of each compartment of the chamber 80, so that in no position of the valve can sugar flow directly from the passages 34 through the opening in the bottom of the chamber 80.

*The operating mechanism.*—The lower portion of the depending bracket 21 forms a horizontal table 100 from which two arms 101 and 102 extend upwardly. The arm 102 contains a groove 103 in which is mounted the actuating member 104 comprising the rack 105 and two spring clips 106 and 107 attached to one end of the rack 105 and adapted to engage a coffee cup or other receptacle. A screw 108 passing through the clip 107 and threaded into the clip 106 provides means for adjusting the clips to receptacles of different sizes. A leaf spring 109 is attached to the lower portion of the table 100 and contains a recess 110 which by contact with the pin 111 upon the bottom of the rack 105 retains the actuating member in advanced position until the cup is pushed within the clips 106, 107. A vertical shaft 115 has a bearing at its lower end in the table 100 and a bearing at its upper end in the table 10. On this shaft near its lower end is mounted a ratchet consisting of a cam 116 attached to the shaft, and a cam 117 rotatably mounted upon the shaft. The cam 117 bears a pinion 119 which meshes with the rack 105. On the upper end of the shaft 115 which projects through the table 10 is mounted a crank 120 which connects by a link 121, with a longer crank 122 mounted upon the stem 123 of the double valve 50.

On the top of the actuating member is a pin 124 adapted to engage the depending portion 125 of the sugar valve 84 when the actuating member is moved forward. An arm 126 is rotatably mounted upon a pin 127 upon the top of the actuating member 124. An adjustable screw 128 is threaded in the upper portion of the arm 126. The arm 126 may be swung transversely to the actuating member 104, as shown in Fig. 6, so as to pass by the depending portion 125 of the sugar valve without engagement. When the arm is swung parallel to the actuating member 104, as shown in Fig. 3, the end of the screw 128 will engage the depending portion 125 of the sugar valve, as the actuating member is moved backward. As the point of engagement of the screw 128 with the depending portion 125 is directly behind the point at which the arm 126 is pivoted to the actuating member, during the backward movement of said member, the pull of the valve tends to retain the arm 126 in operative position, so that no means for retaining it in this position are necessary. By adjustment of the screw 128 the sugar valve may be opened to empty one or more compartments of the sugar chamber 80 each time the actuating member 104 is pushed back into the position shown in the drawings.

Upon the upwardly extending arm 101 is mounted a counter 130 of ordinary construction. On the shaft 131 of the counter is mounted an arm 132 normally held vertical by a spring within the counter, and the counter mechanism is so arranged that a record is made each time the arm 132 is moved from vertical position to the inclined position shown in Fig. 3. Upon the actuating member 104 is a curved pin 133 adapted to engage the lower portion of the arm 132. Pivoted to the rear of the body 19 is a lever 134, one end of which is adapted to engage the upper end of the counter arm 132. The other end of the lever 134 is connected by a link 135 to an arm 136 rigidly attached to the valve of the spigot 58, as shown in Fig. 4.

The operation of the dispensing device described is as follows:—The device is placed upon a table or other convenient support in front of an ordinary coffee urn B. The legs 11 of the dispensing device are then spread apart to lower the table 10 and the body 19 sufficiently to pass the coffee intake 53 under the end of the spigot A of the coffee urn B. The legs 11 are then drawn into vertical position by the tension spring 12 raising the table 10 and the body 19 so that the washer 54 of the coffee intake 53 is brought up around the end of the spigot A, as shown in Fig. 3. The spigot A is then opened. A milk receptacle placed above the level of the milk intake 70 is connected to the milk intake and the spigot or other valve of the milk receptacle is opened. The sugar containers 13 and 14 are filled with granulated sugar.

Assuming the parts of the device to be in the position shown in the drawing, with the exception that the rack 105 is drawn forward until the pin 111 engages the edge of the table 100 and the sugar valve 84 is completely closed, the first result is that coffee will flow from the urn B into the intermediate coffee container 16, filling this container to the point which brings the closure 41 on the float 40 into contact with the lower end of the tube 39 (Fig. 7). At the same time, milk will flow from the milk container into the intermediate milk receptacle 18 until the closure upon the float in that receptacle is brought against the lower end of the tube extending into it. Sugar will flow from the sugar receptacles 13 and 14 through the sugar passages 34 and fill each compartment of the sugar chamber 80.

Figure 2:
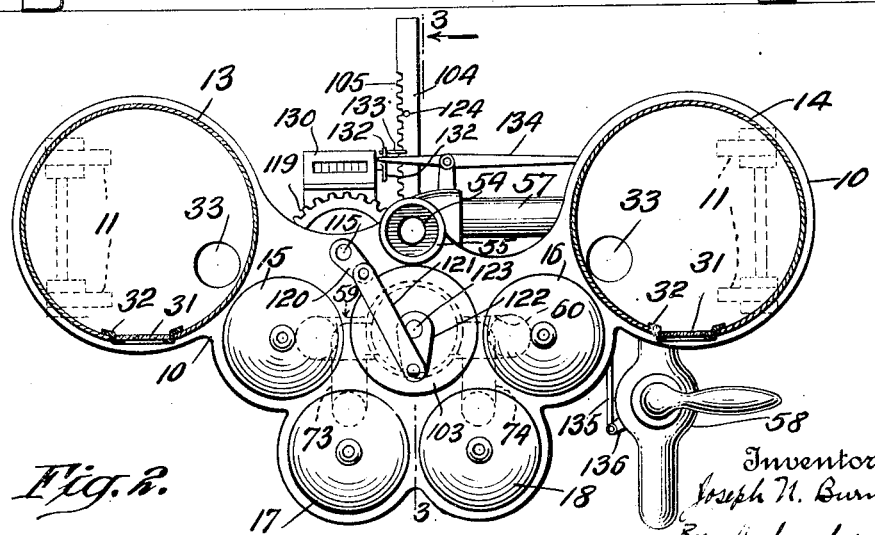
Fig. 2 is a top view of the dispensing device sectioned on the line 2—2 of Fig. 1.

When it is desired to dispense a cup of coffee and milk, it is merely necessary to place the cup between the spring clips 106, 107, and to push the cup back along the table upon which the dispensing apparatus is supported until it is under the outlet 61 in the position shown by the dotted lines in Fig. 3. This results in pushing the rack 105 backward to the position shown in the drawings, where the clip 107 engages the edge of the arm 102. Such movement of the rack causes the following results to take place simultaneously: The pinion 119 is turned through a half revolution by engagement with the rack turning the cam 117 which engages the cam 116 so that the vertical shaft 115 is turned through a half revolution. This turns the crank 120 from the position shown in Fig. 2 to a diametrically opposite position, and, through the link 121, causes the crank 123 upon the stem of the double valve to turn through an arc of 90° so that the double valve is brought to the position indicated in dotted lines in Figs. 4 and 5. This results in the discharge into the cup of the coffee contained in the intermediate receptacle 16 and the milk contained in the intermediate receptacle 18, and in the filling of the intermediate receptacle 15 from the coffee urn and the filling of the intermediate receptacle 17 from the milk receptacle. The screw 128 engages the depending arm 125 of the sugar valve 84 and opens the sugar valve to the position shown in Figs. 3 and 8, so that the sugar contained in the forward compartment of the sugar chamber 80 is allowed to fall into the cup. The pin 133 engages the arm 132 of the counter 130 making a record of the drawing of a cup.

The above described results take place almost instantaneously and result in the dispensing into the cup of a mixture containing the predetermined amounts of coffee and milk and a predetermined amount of sugar. If it is desired to add more sugar than the customary amount, it is merely necessary to press back the sugar valve manually, as by applying a finger to the knob 140 (Fig. 9) so as to permit the sugar contained in the second or the second and third compartments of the sugar chamber 80 to fall into the cup. If, on the other hand, it is desired to draw a cup of coffee without sugar, the arm 126 is turned to one side, as shown in Fig. 6 before the cup is placed under the outlet openings, so that the screw 128 does not engage the depending portion 125 of the sugar valve 84 when the actuating member 104 is pushed back.

As the cup is removed it draws the actuating member 104 forward until the pin 110 engages the edge of the table 100, when the cup is pulled clear of the spring slips 106, 107. The forward movement of the rack 105 rotates the pinion 119 through half a revolution in the opposite direction to its former movement. In the course of this movement, however, the cam 117 moves over the cam 116 so that no movement is imparted to the vertical shaft 115. The pin 124 engages the depending portion 125 of the sugar valve 84 and returns the valve to closed position either from the position shown in Fig. 3 or from a more open position to which it has been pushed to obtain additional sugar. Returning the sugar valve to closed position results in extending the side members 87 of the valve forwardly so that the sides of the sugar chamber 80 are left open and sugar flows into the chamber from the sugar containers 13 and 14 through the sugar passages 83. The pin 133 moves out of engagement with the arm 132 of the counter 130 so that this arm is returned to its normal vertical position.

The above-mentioned results take place almost instantaneously and the device is then in condition to dispense another cup of coffee and milk. When another cup is placed in the position shown by the dotted lines in Fig. 3, the rack is returned to retracted position shown in the drawings and the operation is the same as that already described, except that the crank 120 is moved from its position diametrically opposite to that shown in Fig. 2 to the position shown in Fig. 2 so that the double valve is moved from the position shown in the dotted lines in Figs. 4 and 5 to the position shown in full lines. This time, therefore, the cup is filled from the coffee and milk contained in the intermediate receptacle 15 and 17, while the intermediate receptacles 16 and 18 are being filled from the coffee urn and the milk receptacle. Thus, as a number of cups are placed in succession in the position shown by dotted lines in Fig. 3, the intermediate receptacles are alternately filled and emptied, while the sugar chamber is partly or wholly emptied as each cup is placed in position and refilled when each cup is removed.

When it is desired to draw a cup of black coffee, the cup is placed under the spigot 58 and filled by opening this spigot in the ordinary way, the coffee flowing from the coffee intake 54 directly into the pipe 57 and through the spigot 58. The opening of the spigot 58 moves the rod 135 backward, thus swinging the lever 134 so that its end comes in contact with the upper portion of the lever 132 of the counter 130, moving this arm from vertical position to inclined position and making a record that a cup has been drawn. When the spigot 58 is closed, the rod 135 and the lever 134 are returned to the position shown in Fig. 4, and the arm 132 is free to return to its normal vertical position.

My invention is adapted to many uses other than that specifically set forth in the above description, and many of the features of the invention may advantageously be used separately from other features. In its complete form, however, the embodiment of the invention shown comprises a unitary structure by means of which cups or other receptacles may be filled in rapid succession, each with a mixture containing exactly predetermined amounts of a plurality of liquids and a solid, while the amount of each ingredient may easily be adjusted.

Numerous modifications may be made in the embodiment described without departing from my inventon. Among them are the following:—

The air outlets and intakes 37 of each pair of intermediate containers may be connected by tubes 145, 146, shown in Fig. 1. The use of such tubes has two advantages. It hastens the emptying of the intermediate receptacle which is being emptied by applying to the surface of the liquid in it the air pressure caused by the escape of air from the intermediate receptacle being filled. This pressure may be considerable, as the level of the liquid in the coffee urn or the milk receptacle may be considerably above the intermediate receptacles. Furthermore, the tubes prevent the coffee or milk from spilling in case of a leak between the closure 41 and the lower end of the tube 39.

The spring clips 106 and 107 may be dispensed with, and the actuating member 104 manually operated instead of operated by the movement of the cup.

What is claimed is:

1. Apparatus for dispensing a mixture of a plurality of liquids, comprising separate intakes, each connected to a source of one of said liquids, two sets of intermediate containers each adapted to contain a predetermined amount of liquid, an outlet through which the mixture is to be dispensed, and means for alternately connecting each of one set of said intermediate containers with one of said intakes while simultaneously connecting all of the other set of said intermediate containers with said outlet.

2. Dispensing apparatus having an intake and outlet, and comprising intermediate containers and an oscillatory valve adapted to connect said containers alternately with a source of liquid supplied and an outlet, means for oscillating said valve, comprising an actuating member having a forward and backward movement, a rack upon said actuating member, a gear meshing with said rack, a shaft upon which said gear is rotatably mounted, a ratchet adapted to transfer rotation of said gear in one direction to said shaft, a crank on said shaft, a longer crank upon said valve, and a link connecting said cranks.

3. A dispensing apparatus, comprising an intake, an outlet, intermediate containers, an oscillatory valve, an actuating member having a forward and backward movement, and connecting means between said actuating member and said valve arranged to move said valve in one direction on each alternate backward movement of the actuating member and to move said valve in the other direction on the other alternate backward movements of the actuating member.

4. In a dispensing apparatus, a body having a chamber divided by partitions into a plurality of compartments and formed to provide intake openings connecting each of said compartments to a source of the material to be dispensed, and a dispensing opening from each of said compartments; and a valve adapted to close all said dispensing openings while leaving all said intake openings open while in one position, and to uncover the dispensing openings of said compartments successively, while successively closing the intake openings of said compartments.

5. In a dispensing apparatus, a body having a chamber divided by partitions into a plurality of compartments and formed to provide intake openings connecting each of said compartments to a source of a material to be dispensed, and a dispensing opening from each of said compartments; and a valve having a bottom portion adapted to close said dispensing openings and a side portion adapted to close said intake openings, said side portion overlapping said bottom portion a distance substantially equal to the width of the dispensing opening of each of said compartments so that when said valve is moved it will uncover said dispensing openings successively while successively closing said intake openings without at any time permitting direct access from one of said intake openings to one of said outlet openings.

6. In a dispensing apparatus, a body having a chamber divided by partitions into a plurality of compartments and formed to provide intake openings connecting each of said compartments to a source of the material to be dispensed, and a dispensing opening from each of said compartments; a movable valve arranged to close all said dispensing openings when in forward position and to uncover the dispensing openings of said compartments successively, while successively closing the intake openings of said compartments; an actuating member having a forward and backward movement; means operated by the backward movement of said member for opening said valve a predetermined distance; separate manually operated means for opening said valve further; and connections operated by forward movement of said actuating member for closing said valve.

7. In a dispensing apparatus, a body having a chamber divided by partitions into a plurality of compartments and formed to provide intake openings connecting each of said compartments to a source of the material to be dispensed, and a dispensing opening from each of said compartments; a movable valve arranged to close all said dispensing openings when in forward position and to uncover the dispensing openings of said compartments successively, while successively closing the intake openings of said compartments; means operated by placing a receptacle under said dispensing openings for opening said valve a predetermined distance; manually operated means for opening said valve further; and means operated by removing a receptacle from beneath said dispensing openings for closing said valve.

8. In a dispensing apparatus, a body having a chamber divided by partitions into a plurality of compartments and formed to provide intake openings connecting each of said compartments to a source of the material to be dispensed, and a dispensing opening from each of said compartments a slidable valve adapted to close all said dispensing openings when in closed position and to uncover the dispensing openings of said compartments successively while successively closing the intake openings of said compartments; an actuating member having a forward and backward movement; a stop upon said member adapted to engage said valve and partially open it when said actuating member is moved backward; and a second stop on said actuating member spaced from said first stop and adapted to engage said valve and move it to closed position when said actuating member is moved forward.

9. In a dispensing apparatus, an outlet, a slidable valve controlling said outlet, a movable actuating member, an arm pivotally mounted upon said actuating member, and a stop on said arm adapted to engage said valve at a point directly behind the pivot point of said arm when said arm is parallel to said actuating member and said actuating member moved in one direction, and to pass by said valve without engaging it when said arm is placed transversely to said actuating member.

10. A dispensing apparatus, comprising a coffee intake, a milk intake and a sugar intake, a milk and coffee outlet, a sugar outlet adjacent to said milk and coffee outlet, and means operated by the placing of a receptacle beneath said outlets for discharging a predetermined quantity of coffee, of milk and of sugar into a receptacle so placed.

11. A dispensing apparatus, comprising a coffee intake, a milk intake and a sugar intake, a milk and coffee outlet, a sugar outlet adjacent to said milk and coffee outlet, a movable actuating member, and means operated by said member for discharging a predetermined quantity of coffee, of milk and of sugar into a receptacle placed beneath said outlets.

12. A dispensing apparatus, comprising an intake connected with a source of liquid to be dispensed, two intermediate containers adapted to hold predetermined quantities of liquid, a liquid outlet, an intake for a solid to be dispensed, a chamber adapted to hold a predetermined quantity of said solid, an outlet from said chamber adjacent to said liquid outlet, an actuating member having a forward and backward movement, means operated by said actuating member for connecting one of said intermediate containers with said liquid intake and disconnecting it from said liquid outlet while simultaneously connecting the other of said containers with the liquid outlet and disconnecting it from the liquid intake on each alternate backward movement of the actuator and for reversing the connections of said intermediate containers on the other alternate backward movements of the actuating member, and means operated by said actuating member for opening said solid outlet and closing said solid intake when said actuating member is moved back and closing said solid outlet and opening said solid intake when said actuating member is moved forward.

In testimony whereof I have hereunto set my hand in the presence of two subscribing witnesses.

JOSEPH N. BURNO.

Witnesses:
ETHEL JOHNES,
MAISIE MAURUS.